Jan. 9, 1951            J. W. WABER            2,537,107
METHOD OF MAKING INNER TUBES FOR PNEUMATIC TIRES
Filed June 20, 1947            2 Sheets-Sheet 1
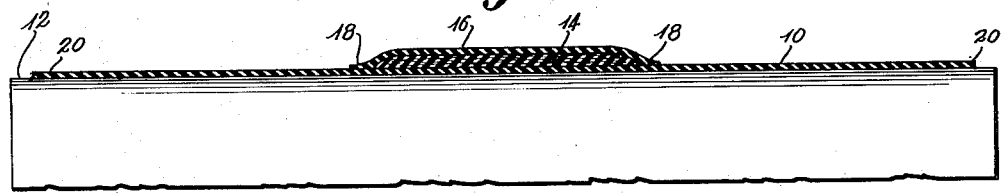
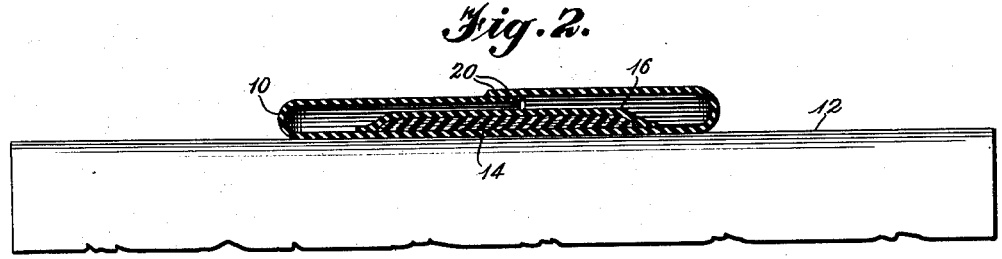
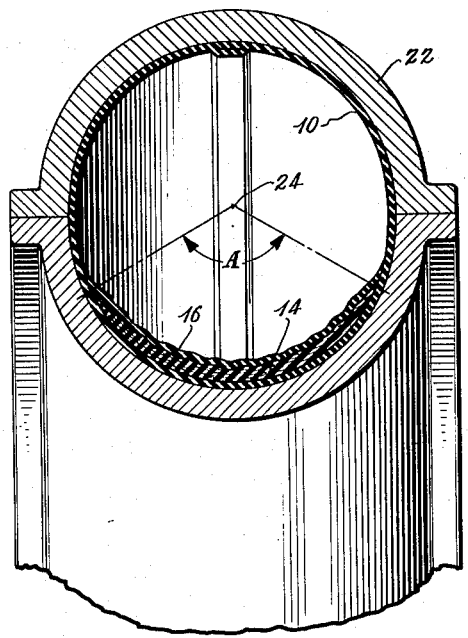
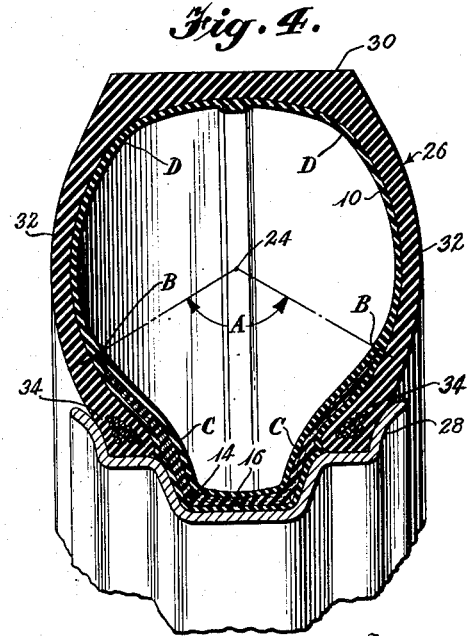
Inventor
James W. Waber
By Raymond Wholton
Attorney Jan. 9, 1951  J. W. WABER  2,537,107
METHOD OF MAKING INNER TUBES FOR PNEUMATIC TIRES
Filed June 20, 1947  2 Sheets-Sheet 2
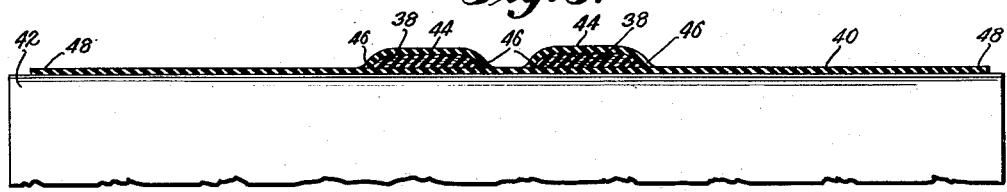
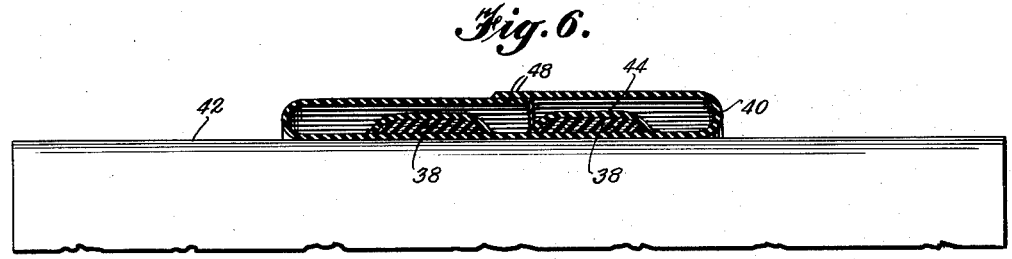
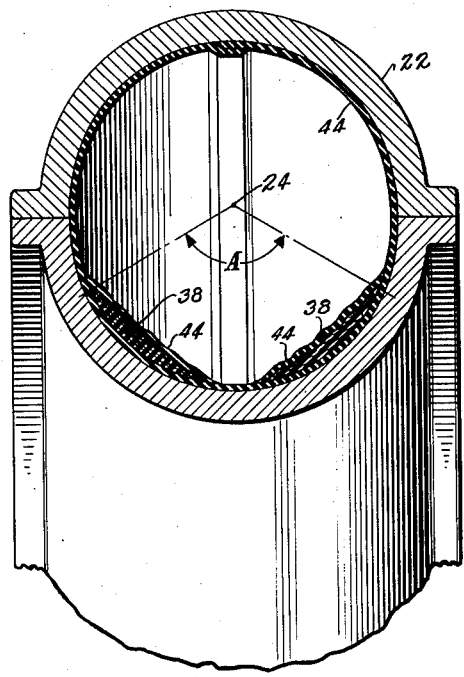
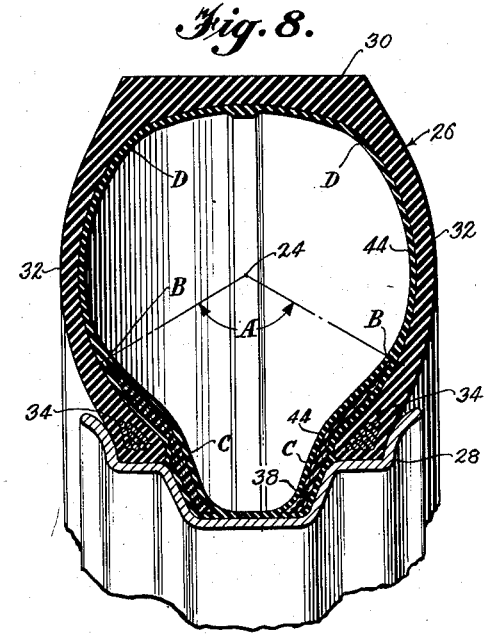
Inventor
James W. Waber
By Raymond Wholton
Attorney Patented Jan. 9, 1951

2,537,107

UNITED STATES PATENT OFFICE 2,537,107

METHOD OF MAKING INNER TUBES FOR PNEUMATIC TIRES

James W. Waber, Chicago, Ill.

Application June 20, 1947, Serial No. 755,924

14 Claims. (Cl. 154—15)

One of the most frequent single causes of failure of pneumatic tires, and one that has apparently been neglected throughout the history of the art, is what is commonly known as "rim pinch." Although this source of trouble has existed from the earliest days of the inner tube, and has been extremely costly from the standpoints of personal injury and damage to property, its effects have been increased rather than reduced by a number of the developments of recent years. The use of reduced pressures in balloon and semi-balloon tires, the adoption of the drop-center rim, the trend towards wider base rims, and the applications of synthetic rubber have contributed appreciably to the dangers and frequency of rim pinch; and although manufacturers in the automotive and tire industries have studied the problems at length, neither they nor the thousands engaged in tire maintenance and repair, nor the millions of vehicle operators have come forward with a satisfactory solution. Such expedients as the use of liners on the one hand, and increasing the tube thickness at the rim and bead zones on the other, have often delayed the failures of tubes from this case, but never satisfactorily prevented them.

The art is replete with disclosures of so-called "puncture proof" tires and tubes, and the use of self-sealing or self-healing compositions at the inner and outer peripheries of inner tubes for this purpose may be found in many patents including those in the name of the present inventor, No. 1,808,091, dated June 2, 1931, and No. 2,161,490, dated June 6, 1939; but such concepts have been a far cry from the problems presented by casing bead injury and rim pinch. After many years of experience in the tire and tube art, supplemented by extended research on the specific problems presented by casing bead injury and rim pinch, the present inventor submitted applications for Letters Patent, Serial No. 532,333, filed April 22, 1944, now abandoned; Serial No. 575,984, filed February 3, 1945, now abandoned; and Serial No. 586,119 filed April 2, 1945, now abandoned; of which this application is deemed to be a continuation-in-part.

When an inner tube of standard construction is completely inflated within a rim mounted casing, it is expanded until it assumes the size and shape of the chamber defined by the rim and casing, the outer wall of the tube ultimately conforming to the internal walls of the chamber so defined. During the initial stages of its expansion, the tube receives a substantially toroidal form until its tread and side wall zones bear upon the corresponding zones of the casing with sufficient force to restrain further expansion in these zones. Further distension of the tube then occurs principally in the bead and rim zones with the result that the tube wall in these zones undergoes an appreciably greater degree of stretching than that experienced in its tread and side wall zones. Consequently the wall thickness of a standard inflated tube becomes substantially less at the rim and bead zones. Continued inflation exerts progressively greater stretch upon progressively diminishing portions of the tube, so that frequently, localized areas reach conditions of high stress and even rupture. Yet it is in these highly stressed zones that the toes of the casing beads engage the rim and define relatively sharply converging annular grooves which the tube walls must fill; it is here that the greatest relative movement between the casing and rim is experienced in service; and it is here that rust and other destructive influences are so often encountered. Hence, it is small wonder that it is here, due to repeated flexure of portions of the tube wall under excessive tension, fatigue, the primary cause of the trouble, produces the effect known as rim pinch.

It is towards the solution of these problems that this invention is directed, and based upon the tubes and methods of producing the same conceived by the present inventor, the motoring public can at last be spared the anguish to which it has been subjected these many decades because of the ever present danger of the effects of casing bead injury and rim pinch.

The objects of this invention are achieved by interposing a body of easily displaceable unvulcanizable plastic composition, which may also possess self-healing or sealing characteristics, between the air chamber of the inner tube and the chamber defined by the wheel rim and casing so that the composition bridges the junction of the bead and rim zones, the easily displaceable permanently flowable composition conforming to the irregularities such as the rather sharp annular grooves defined at the bead and rim joints, promoting substantially uniform stresses upon the air confining wall of an inflated tube in these zones and thus obviating sharp bending and excessive distortion of the air confining wall of the tube. The plastic composition though always displaceable to fulfill its function, is preferably confined in a general way to its circumferential position with respect to the generatrix axis of the tube, by securing to the tube wall beyond the edges of the plastic material, a covering strip or annulus of vulcanizable resilient material similar in composition to that constituting the tube itself, defining with the original tube wall, a closed pocket confining the composition. The covering strip is preferably secured to the tube wall by vulcanization, and according to this invention the plastic composition and its covering strip are applied internally to the tube wall.

The plastic composition extends, from portions of the tube cross-section displaced by not less than 90° with respect to the generatrix axis of the tube, the preferred angle being approximately or at least 120°; towards the rim zone. The composition is preferably symmetrically disposed with respect to the rim zone, and in the form of one or more annuli. The annular body or bodies of plastic composition may be substantially uninterrupted or may assume the form of two spaced annuli, dictated in part by service conditions to be encountered and the characteristics of the tire casing with which it is employed.

The method of producing inner tubes of the type contemplated herein comprises supporting an endless belt of vulcanizable material with a surface thereof exposed, applying an annular layer of unvulcanizable easily displaceable plastic composition to at least a portion of the exposed surface, joining the edges of the belt to enclose the plastic composition and form an endless tube, and curing the product thus formed. It is important that the plastic composition bridge the bead and rim zone portions of the surface to which it is applied and under some conditions it is preferred that the plastic composition entirely cover such bead and rim zone portions. The portion of the surface to which the plastic composition is applied in the latter case may be approximately one-third of the width of the belt, to assure that such plastic composition will extend over an arc of approximately 120° of the periphery of the cross section of the ultimate tube, symmetrically with respect to the plane of the generatrix axis of the tube. Prior to joining the edges of the belt to form an endless tube, it is preferred in most cases to secure a vulcanizable cover strip to portions of the exposed surface beyond the plastic composition, for confining it in a general way, to a predetermined arc of the circumference of the ultimate tube. Under these circumstances, the cover strip will completely bridge the composition and its edges will be united with the exposed surface of the belt beyond the plastic composition. After the edges of the belt have been brought together and secured to form the endless tube, the entire structure is inflated and confined within a suitable mold, whereupon a curing operation is effected under vulcanizing conditions. The method practiced in accordance with this invention will therefore enclose the plastic composition and its cover strip within the body of the tube defined by the original flat belt.

Where preferred, the plastic composition may be applied to the exposed surface of the belt in the form of spaced annuli. The plastic bodies in this case, as in the preceding one may be suitably preformed, as by extrusion, and their co-operating vulcanizable cover strips may likewise be preformed by extrusion or otherwise. Where such spaced annuli are employed, the plastic composition will be discontinuous in the rim zone of the ultimate tube, the remote edges thereof being displaced symmetrically by an angle of approximately 120° with respect to the plane of the tube genetratrix axis, the proximity of the edges in the rim zone being sufficient to insure that the plastic composition will bridge the joints formed between the beads of the tire on the one hand and the rim with which the tube is to be used on the other. Accordingly, the angle of 120° is not critical so long as the complete bridging of these joints is satisfied, and by the same token, the spacing between the proximate edges of the annuli is not critical so long as the prescribed bridging effect is accomplished. Here again, after the annular bodies of plastic composition and their cover strips have been applied to the exposed surface of the belt, the edges of the belt are brought together to form a tube enclosing the plastic composition, and the product thus formed is inflated in a mold and subjected to curing under vulcanizing conditions.

As result of the curing step in either case, the edges of the cover strips will become firmly bonded to the internal wall of the tube thus formed, defining pockets within which the plastic composition will be confined in a general way, but permitted and intended to flow so as to conform to any irregularities encountered in the chamber defined by the rim and casing with which a particular tube is to be used.

A more complete understanding of the invention will follow from a detailed description of the steps involved as depicted in the accompanying drawings, wherein:

Figs. 1, 2 and 3 are fragmentary sectional elevations depicting various steps in the production of one form of tube contemplated;

Fig. 4 is a fragmentary sectional elevation depicting a tube of the type produced in accordance with Figs. 1 to 3, assembled with a casing and rim;

Figs. 5, 6 and 7 are fragmentary sectional elevations depicting various steps in the production of another form of tube contemplated; and Fig. 8 is a fragmentary sectional elevation depicting a tube of the type produced in accordance with Figs. 5 to 7, assembled with a casing and rim.

With reference to Fig. 1, an annular belt 10 of vulcanizable material is applied to a drum 12 in a suitable manner. Belts of this type have been produced in the past by rolling off from a rubber calender several thin sheets of vulcanizable material which are plied up one upon the other to form a long continuous sheet from which desired sizes and shapes can be cut, depending upon the dimensions of the ultimate tube to be formed. A piece of stock thus cut, is placed upon a revolving drum and its ends are secured together to form the flat endless belt 10 which will define the initial wall of the finished tube. A preformed body of unvulcanizable easily displaceable plastic composition 14, prepared by extrusion or otherwise, is then applied substantially medially of the exposed surface of the belt 10, the ends of the plastic composition being brought together to form an annulus occupying approximately ⅓ of the width of the belt. A preformed cover strip 16 of vulcanizable material, which may be similar to that constituting the belt, is superimposed over the plastic composition and its ends are brought together to form an annulus, its edges 18 overhanging the plastic composition being secured to adjacent portions of the exposed belt surface. The remote edges 20 of the belt are then brought together in a manner depicted in Fig. 2 and secured, one to the other, to form an annular tube enclosing the plastic composition 14 and its cover strip 16. The surface of the cover strip exposed within the tube thus defines a portion of the air confining chamber of the ultimate tube.

The tube thus formed is stripped from the drum 12 and placed in a separable mold 22, as shown in Fig. 3, inflated to substantially toroidal form, and cured under vulcanizing conditions. It will be noted that the plastic composition 14 occupies an arc of approximately 120° subtended from the generatrix axis 24 and that the innermost surface of the cover strip 16 assumes a fluted or wrinkled condition as result of its foreshortening upon inflation of the tube to this extent.

The inflation of the tube may be accomplished by means of a standard type of valve, not shown, disposed at an appropriate point, or where the plastic composition 14 possesses self healing or sealing properties, the inflation may be accomplished through an inserted hollow needle in a manner already known in the art.

In Fig. 4, a tube produced in the manner just described is depicted as fully inflated within a chamber defined by a tire casing 26 and a rim 28. The casing having the usual tread portion 30, side wall portions 32, and beads 34, is engaged by the respective zones of the tube, namely, the tread zone DD, side wall zones BD, and bead zones BC, while the tube rim zone CC overlies the rim 28. The angle A subtended from the generatrix axis of the tube is shown as approximating 120° through which the plastic composition extends over the bead and rim zones of the tube. At the junctions of the rim and casing beads, the rather sharp annular grooves defined are occupied by reversely bent portions of the outer wall of the tube, backed up by the plastic composition which has flowed to assume a substantially complementary cross sectional configuration, so that when the stresses usually resulting in rim pinch are applied in these areas, they are ineffective to damage the wall of the air confining chamber, the plastic composition serving to distribute over a wide area, all forces of this nature to which it is subjected.

The method may be similarly practiced where spaced annular bodies of unvulcanizable easily displaceable plastic composition 38 are applied to the exposed surface of an endless belt of vulcanizable material 40 mounted on a drum 42. The proximate edges of these spaced plastic annuli are separated substantially medially of the belt by an amount that will assure that the composition will bridge the joints between the tire beads and rim with which the ultimate tube is to be used, and thereby accomplish the objective of avoiding rim pinch. As shown in Fig. 5, the plastic bodies are provided with cover strips 44 whose overhanging edges 46 are secured to portions of the exposed surface of the belt adjacent the edges of the plastic composition, the application of the plastic annuli and cover strips being similar to the mode of assembly described with reference to the single annulus. The edges 48 of the plastic belt are next brought together and secured in the manner shown in Fig. 6 to form an endless tube enclosing the plastic bodies 38 and their cover strips 44, the cover strips now defining a portion of the air confining wall of the tube. The tube thus formed is stripped from the drum 42, placed in a separable mold 22 and inflated to substantially toroidal form as illustrated in Fig. 7, for curing under vulcanizing conditions. Here again, the surfaces of the cover strips 44 exposed within the tube will become wrinkled or fluted while in this form due to their foreshortening, the plastic composition extending towards the rim zone from portions of the cross section of the tube displaced by an angle A of approximately 120° with respect to the generatrix axis 24 of the tube. As previously indicated, the annuli are separated somewhat in the rim zone, the degree of separation being subject to the limitation that the plastic composition must adequately bridge the joints between the casing beads and rim to avoid rim pinch.

As depicted in Fig. 8, the casing 26 and the rim 28 define a chamber within which the tube 44 is completely inflated with its tread zone DD, side wall zones BD and bead zones BC substantially coextensive with the casing tread portion 30, side wall portions 32 and bead portions 34, respectively; the rim zone CC of the tube extends over that portion of the rim 28 which completes the tube receiving chamber. It will be noted that the plastic composition extends towards the rim zone, from portions of the tube cross section displaced by an angle A, approximating 120°, subtended from the generatrix axis 24 of the tube. Here again, it will be observed that the outer wall of the inner periphery of the tube contiguous to the tube confining chamber, receives the sharp bends and stresses imposed by the rim and casing under service conditions. Since this is not the air confining wall, the forces imposed will be transmitted through the conforming plastic composition which has become displaced to substantially complement the chamber and to distribute to the air confining wall of the tube over a large area thereof, the effect of such forces.

Whereas the composition of the unvulcanizable easily displaceable plastic composition may vary appreciably, an example of such a composition, representing a successful application is:

| | Per cent |
|---|---|
| Rubber #1 smoke sheets | 40 |
| Tube reclaim (no free sulphur) | 42 |
| Rosin oil | 18 |

A suitable composition, by way of example, which may be used for the inner tube itself and for the cover strip for confining the plastic composition, may be as follows:

| | Parts |
|---|---|
| Rubber (smoked sheets) | 100.00 |
| Stearic acid | 1.00 |
| Trimethyl-dihydroquinoline (Agerite resin D) | 2.00 |
| Zinc oxide | 5.00 |
| Soft carbon (P 33) | 40.00 |
| Sulfur | 0.75 |
| Mercaptobenzothiazole (Captax) | 0.75 |
| Benzothiaxyl disulfide (Altax) | 0.75 |
| Tetramethylthiuram disulfide (Tuads) | 0.25 |
| Tellurium (Telloy) | 0.50 |

The initial belt to which the plastic compositions and cover strips are applied may be vulcanized or unvulcanized at the time the layers are applied, since the ultimate conditions to which the composite tube is subjected can be used to effect vulcanization of this component as well.

It will be clear from the foregoing that in the inner tube of the present invention, the easily displaceable plastic composition actually undergoes definite displacement in service as an essential feature of the performance of its function, as contrasted with prior art disclosures of plastic inserts for other purposes definitely positioned to retain assigned forms with respect to their tube walls. Due to such displacement of the plastic composition under service conditions in the present case, its cross section in use will necessarily vary appreciably from that initially assigned thereto.

Whereas the method has been described as applied to two types of tubes, it will be understood by those skilled in the art as it has been recognized by the present inventor, that the method is more widely applicable and the specific examples set forth herein should not be regarded as restrictive beyond the scope of the appended claims.

I claim:

1. A method of producing an inner tube for pneumatic tires comprising supporting an endless belt of vulcanizable material with a surface thereof exposed, applying an annular layer of unvulcanizable easily displaceable plastic composition to at least a portion of said surface, subsequently joining the edges of said belt to form an endless tube, and curing the product thus formed.

2. A method of producing an inner tube for pneumatic tires comprising supporting an endless belt of vulcanizable material with a surface thereof exposed, applying an annular layer of unvulcanizable easily displaceable plastic composition to cover the bead and rim zone portions of said surface, subsequently joining the edges of said belt to form an endless tube, and curing the product thus formed.

3. A method of producing an inner tube for pneumatic tires comprising supporting an endless belt of vulcanizable material with a surface thereof exposed, applying an annular layer of unvulcanizable easily displaceable plastic composition to a portion of said surface approximating one-third of the width of said belt, subsequently joining the edges of said belt to form an endless tube, and curing the product thus formed.

4. A method of producing an inner tube for pneumatic tires comprising supporting an endless belt of vulcanizable material with a surface thereof exposed, applying an annular layer of unvulcanizable easily displaceable plastic composition to at least a portion of said surface, applying a cover strip to said surface bridging said composition, subsequently joining the edges of said belt to form an endless tube, and curing the product thus formed.

5. A method of producing an inner tube for pneumatic tires comprising supporting an endless belt of vulcanizable material with a surface thereof exposed, applying an annular layer of unvulcanizable easily displaceable plastic composition to at least a portion of said surface, subsequently joining the edges of said belt to form an endless tube, inflating said tube in a mold, and curing the product thus formed.

6. A method of producing an inner tube for pneumatic tires comprising supporting an endless belt of vulcanizable material with a surface thereof exposed, applying an annular layer of unvulcanizable easily displaceable plastic composition to at least a portion of said surface, subsequently joining the edges of said belt to form an endless tube, inflating said tube, and curing the product thus formed.

7. A method of producing an inner tube for pneumatic tires comprising supporting an endless belt of vulcanizable material with a surface thereof exposed, applying an annular layer of unvulcanizable easily displaceable plastic composition to at least a portion of said surface, subsequently joining the edges of said belt to enclose said composition and to form an endless tube, and curing the product thus formed.

8. A method of producing an inner tube for pneumatic tires comprising supporting an endless belt of vulcanizable material with a surface thereof exposed, applying spaced annular layers of unvulcanizable easily displaceable plastic composition to portions of said surface, subsequently joining the edges of said belt to form an endless tube, and curing the product thus formed.

9. A method of producing an inner tube for pneumatic tires comprising supporting an endless belt of vulcanizable material with a surface thereof exposed, applying spaced annular layers of unvulcanizable easily displaceable plastic composition to spaced portions of the rim and bead zones of said surface, subsequently joining the edges of said belt to form an endless tube, and curing the product thus formed.

10. A method of producing an inner tube for pneumatic tires comrising supporting an endless belt of vulcanizable material with a surface thereof exposed, applying spaced annular layers of unvulcanizable easily displaceable plastic composition to portions of said surface displaced by approximately one-third of the width of said belt towards its center, subsequently joining the edges of said belt to form an endless tube, and curing the product thus formed.

11. A method of producing an inner tube for pneumatic tires comprising supporting an endless belt of vulcanizable material with a surface thereof exposed, applying spaced annular layers of unvulcanizable easily displaceable plastic composition to portions of said surface, applying annular vulcanizable cover strips to said body over said composition, subsequently joining the edges of said belt to form an endless tube, and curing the product thus formed.

12. A method of producing an inner tube for pneumatic tires comprising supporting an endless belt of vulcanizable material with a surface thereof exposed, applying spaced annular layers of unvulcanizable easily displaceable plastic composition to portions of said surface, subsequently joining the edges of said belt to form an endless tube, inflating said tube in a mold, and curing the product thus formed.

13. A method of producing an inner tube for pneumatic tires comprising supporting an endless belt of vulcanizable material with a surface thereof exposed, applying spaced annular layers of unvulcanizable easily displaceable plastic composition to portions of said surface, subsequently joining the edges of said belt to form an endless tube, inflating said tube, and curing the product thus formed under vulcanizing conditions.

14. A method of producing an inner tube for pneumatic tires comprising supporting an endless belt of vulcanizable material with a surface thereof exposed, applying spaced annular layers of unvulcanizable easily displaceable plastic composition to portions of said surface, subsequently joining the edges of said belt to enclose said composition and to form an endless tube, and curing the product thus formed.

JAMES W. WABER.

REFERENCES CITED

The following references are of record in the file of this patent:

UNITED STATES PATENTS

| Number | Name | Date |
|---|---|---|
| 1,244,236 | Oberfelder | Oct. 23, 1917 |
| 1,285,719 | Jeffries | Nov. 26, 1918 |
| 1,463,987 | Wildman | Aug. 7, 1923 |
| 1,619,119 | Hastings | Mar. 1, 1927 |
| 1,808,091 | Waber | June 2, 1931 |
| 2,161,490 | Waber | June 6, 1939 |